UNITED STATES PATENT OFFICE.

JOE E. RIOUX, OF MINNEAPOLIS, MINNESOTA.

COMPOSITION OF MATTER FOR DOUGHNUT MIX.

1,370,913.      Specification of Letters Patent.      Patented Mar. 8, 1921.

No Drawing.      Application filed March 19, 1920. Serial No. 367,251.

*To all whom it may concern:*

Be it known that I, JOE E. RIOUX, a citizen of the United States, residing at Minneapolis, in the county of Hennepin and State of Minnesota, have invented a new and useful Composition of Matter for Doughnut Mix, of which the following is a specification.

The object of my invention is the production of a doughnut mix to be worked and cooked in machines made therefor, and by means of which said mix is rapidly delivered in a thoroughly cooked condition, as doughnuts.

My composition consists of a mixture of yolks of eggs, sugar, mace, oil, milk, flour, salt, cream of tartar, baking soda, and if preferred oil of lemon or other suitable flavoring extract.

In preparing the composition I use the ingredients in about the following proportions—viz., the yolks of seventeen eggs, (17), two pounds and fourteen ounces of white granulated sugar, and one half ($\frac{1}{2}$) ounce of mace. The above ingredients are all mixed well together; the mace being mixed with the sugar before the sugar and yolks of eggs are put together.

After the above ingredients are thoroughly mixed I add thereto three fourths ($\frac{3}{4}$) of a pint of oil, which may be vegetable oil or melted lard, and two and three quarters ($2\frac{3}{4}$) quarts of milk from which substantially all the cream has been removed; said oil and milk being well stirred into the first named mixture. The oil or melted lard forms a shortening.

Five pounds of sifted winter wheat flour, one and one half ($1\frac{1}{2}$) ounces of salt, one and one half ($1\frac{1}{2}$) ounces of baking soda, three (3) ounces of cream of tartar, are thoroughly mixed together, and then five (5) additional pounds of flour are added thereto; two and one half ($2\frac{1}{2}$) pounds of which is, preferably, common flour. The purpose of adding the salt, baking soda and cream of tartar to one half ($\frac{1}{2}$) the total quantity of flour used, is for ease of handling and mixing the same.

The last named ingredients, comprising the flour, salt, baking soda and cream of tartar, are well sifted together and then added to the first mixture comprising the yolks of eggs, sugar, mace, oil and skimmed milk, making my doughnut mix, which is then deposited in a hopper and cut, with a taut wire, as it flows from said hopper, and cooked by a machine designed therefor, as recited.

I find that my doughnut mix, made of the ingredients named, joined in the manner described, will continuously flow from said hopper, and can be successfully run through a machine, and rapidly and thoroughly cooked, in the center of each doughnut made thereof, as well as on the outside thereof, and said doughnuts will be light in composition, tasty, and agreeably masticated.

I claim:

A semi-liquid composition of matter consisting of milk and flour, with the other ingredients necessary to a doughnut, in such proportions that due to the amount of milk present, the mix is capable of being poured into hot grease to form a doughnut.

JOE E. RIOUX.

In presence of—
FRED W. HEINRICHS,
I. R. DAVENPORT.